US012596478B2

(12) United States Patent
Jaloma et al.

(10) Patent No.: US 12,596,478 B2
(45) Date of Patent: Apr. 7, 2026

(54) SHARED MEMORY AUTONOMIC SEGMENT SIZE PROMOTION IN A PAGED-SEGMENTED OPERATING SYSTEM

(71) Applicant: International Business Machines Corporation, Armonk, NY (US)

(72) Inventors: Jaime Jaloma, Austin, TX (US); Mark Rogers, Round Rock, TX (US); Arnold Flores, Round Rock, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 18/063,278

(22) Filed: Dec. 8, 2022

(65) Prior Publication Data

US 2024/0192851 A1     Jun. 13, 2024

(51) Int. Cl.
*G06F 12/00*          (2006.01)
*G06F 3/06*           (2006.01)

(52) U.S. Cl.
CPC ............ *G06F 3/061* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,691,206 B1 | 2/2004 | Rubinstein | |
| 9,967,222 B2 | 5/2018 | Feng et al. | |
| 10,785,348 B2 | 9/2020 | Shillingburg et al. | |
| 11,281,388 B2 | 3/2022 | Wen | |
| 2007/0294499 A1* | 12/2007 | Garthwaite | ......... G06F 12/0253 |
| | | | 711/170 |
| 2009/0254715 A1 | 10/2009 | Jeong | |
| 2018/0349289 A1* | 12/2018 | Wang | .................. G06F 12/1027 |

FOREIGN PATENT DOCUMENTS

| | | |
|---|---|---|
| CN | 103647759 B | 11/2017 |
| CN | 106339258 B | 10/2019 |
| WO | 2021103822 A1 | 6/2021 |

* cited by examiner

*Primary Examiner* — Daniel D Tsui
(74) *Attorney, Agent, or Firm* — Patterson + Sheridan, LLP

(57) ABSTRACT

A system and methods are provided for implementing a selected segment size of a shared memory object in a paged-segmented operating system. A user selected shared memory object autonomic promotion feature enables a selected segment size of a shared memory object for a user application. A paged-segmented operating system receiving a request for a shared memory object of a user application, accesses the user selected shared memory object autonomic promotion feature to identify a user selection. An identified user selection is evaluated with secondary criteria for the request shared memory object for the user application and a segment size is set. The operating system creates a shared memory object with the set segment size for the user application. Enabling shared memory objects to be supported by a large segment size reduces the number of segments used for a single shared memory object and application performance can be significantly improved.

20 Claims, 5 Drawing Sheets

AUTONOMIC SEGMENT PROMOTION
400

START ⟋402

REQUEST OBJECT DEFAULT SEGMENT SIZE ⟋404

CREATE OBJECT AS REQUESTED ⟋408

CHECK AUTONOMIC PROMOTION CONTROL ⟋406

OFF

ON

CHECK SECONDARY PROMOTION CRITERIA ⟋410

MEETS

FAILS

CREATE OBJECT WITH PROMOTED SEGMENT ⟋412

END ⟋414

SHARED MEMORY OBJECT
300

AUTONOMIC SEGMENT PROMOTION
400

402 START

404 REQUEST OBJECT DEFAULT SEGMENT SIZE

406 CHECK AUTONOMIC PROMOTION CONTROL

408 CREATE OBJECT AS REQUESTED

410 CHECK SECONDARY PROMOTION CRITERIA

412 CREATE OBJECT WITH PROMOTED SEGMENT

414 END

OFF

ON

MEETS

FAILS

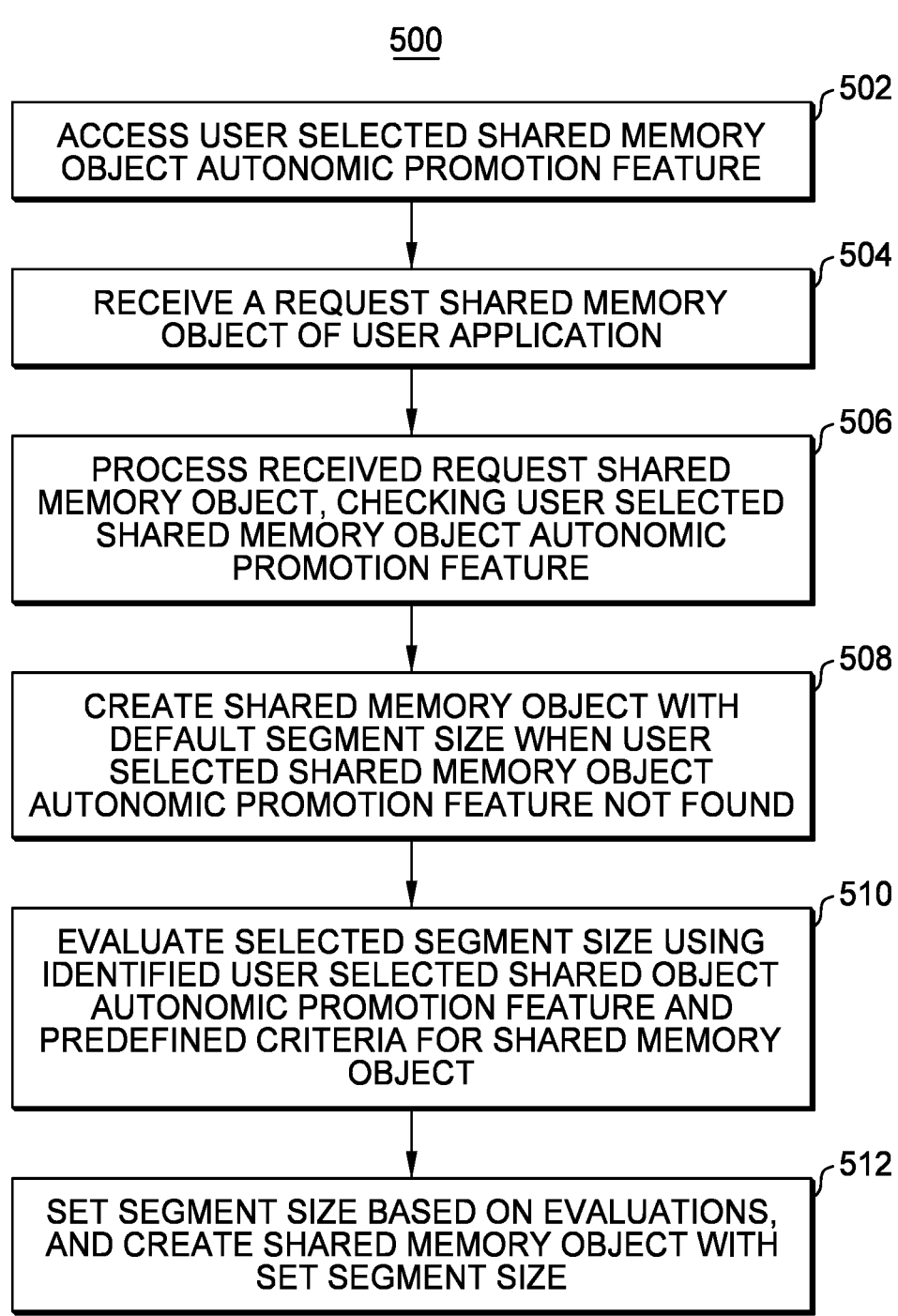

500

502
ACCESS USER SELECTED SHARED MEMORY OBJECT AUTONOMIC PROMOTION FEATURE

504
RECEIVE A REQUEST SHARED MEMORY OBJECT OF USER APPLICATION

506
PROCESS RECEIVED REQUEST SHARED MEMORY OBJECT, CHECKING USER SELECTED SHARED MEMORY OBJECT AUTONOMIC PROMOTION FEATURE

508
CREATE SHARED MEMORY OBJECT WITH DEFAULT SEGMENT SIZE WHEN USER SELECTED SHARED MEMORY OBJECT AUTONOMIC PROMOTION FEATURE NOT FOUND

510
EVALUATE SELECTED SEGMENT SIZE USING IDENTIFIED USER SELECTED SHARED OBJECT AUTONOMIC PROMOTION FEATURE AND PREDEFINED CRITERIA FOR SHARED MEMORY OBJECT

512
SET SEGMENT SIZE BASED ON EVALUATIONS, AND CREATE SHARED MEMORY OBJECT WITH SET SEGMENT SIZE

FIG. 5

SHARED MEMORY AUTONOMIC SEGMENT SIZE PROMOTION IN A PAGED-SEGMENTED OPERATING SYSTEM

BACKGROUND

The present invention relates to the data processing field, and more specifically, to a system and method for implementing a selected segment size of a shared memory object in a paged-segmented operating system.

Shared memory is a memory shared between two or more processes. As used in the present application, a shared memory object is described by a segment or data control structure with a unique ID that points to an area of physical memory. For example, a segment size refers to an underlying data structure used to contain a shared memory object made up of pages. With a shared memory object, a segment functions as a container of the pages. That is, for a specific memory object described by and made up of pages, the segment is a container that holds those pages that make up that specific shared memory object.

For example, during some operating system calls or process operations time, such as fork, exec, and exit, the operating system must attach or detach any shared memory objects as needed. As the size of shared memory objects continues to increase, the number of segments that must be managed by the operating system memory manager has increased accordingly. Performance suffers as a result of a large number of segments that must be managed by the operating system during various system call operations.

SUMMARY

Embodiments of the present disclosure are directed to a system and methods for implementing a selected segment size of a shared memory object in a paged-segmented operating system. A non-limiting computer-implemented method provides a user selected shared memory object autonomic promotion feature enabling a selected segment size of a shared memory object. A paged-segmented operating system receiving a request for a shared memory object of a user application, processes the shared memory object request and determines a segment size related to an associated user selected shared memory object autonomic promotion feature for the user application. The operating system creates the shared memory object having one or more segments with the set segment size. The operating system optionally identifies secondary criteria for the request shared memory object, selectively sets a segment size for the request shared memory object and creates a shared memory object with the set segment size for the user application.

Other disclosed embodiments include a computer system and computer program product for implementing a selected segment size of a shared memory object in a paged-segmented operating system comprising features of the above-disclosed method.

BRIEF DESCRIPTION OF THE DRAWINGS

FIG. 5 is a flow chart illustrating example system operations of one or more embodiments for implementing a selected segment size of a shared memory object in a paged-segmented operating system.

DETAILED DESCRIPTION

Figure 1:
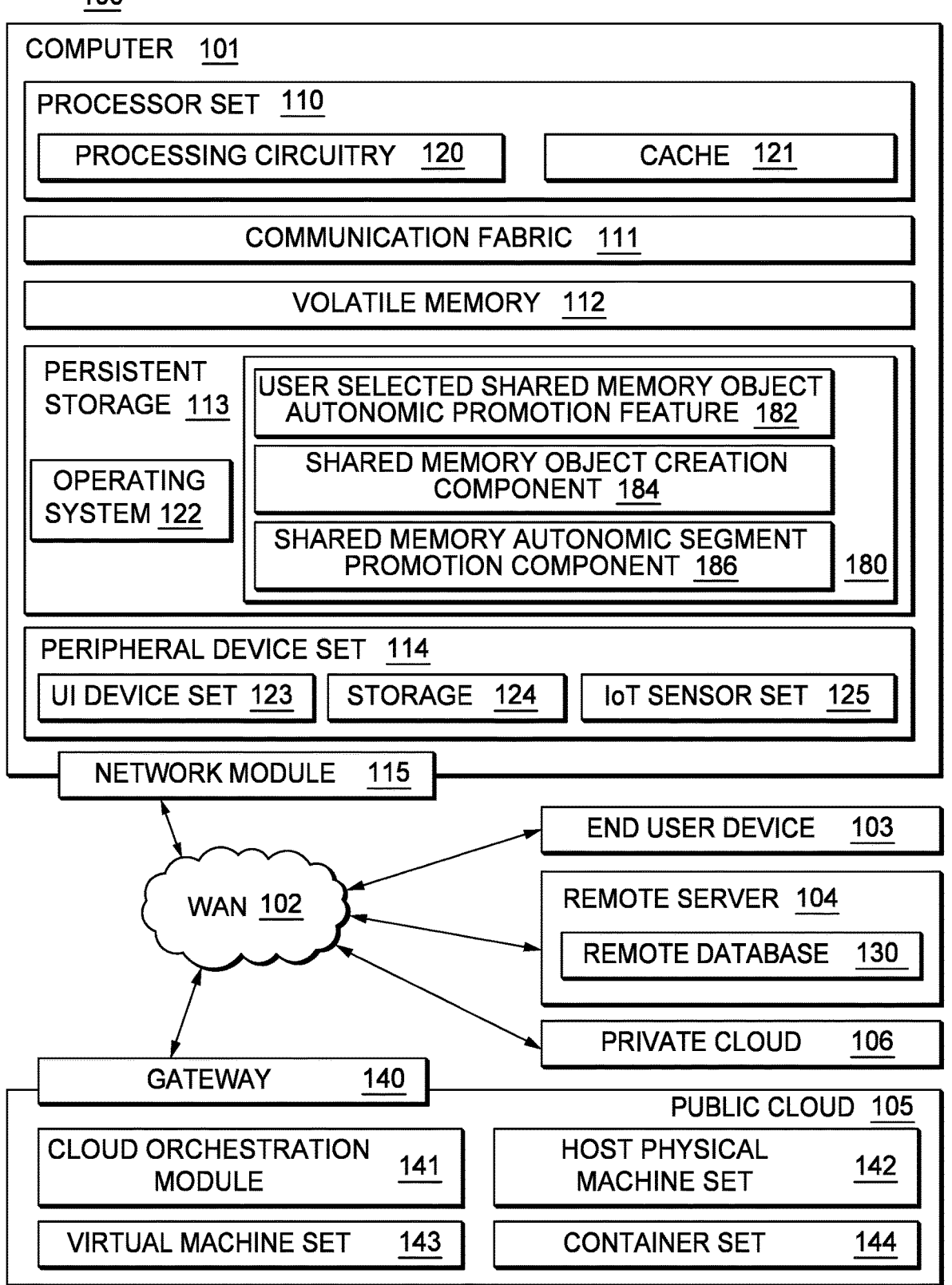
FIG. 1 is a block diagram of an example computer environment for use in conjunction with one or more disclosed embodiments for implementing a selected segment size of a shared memory object in a paged-segmented operating system.

Embodiments of the present disclosure enable enhanced shared memory object management features by implementing a selected segment size of a shared memory object. By allowing memory objects to be supported by a larger segment size as compared to a default segment size, the number of segments that are managed by the operating system memory manager for a single shared memory object can be significantly lowered. As a result, application performance can be significantly improved.

Embodiments of the present disclosure provide a user selected shared memory object autonomic promotion feature enabling a selected segment size of a shared memory object. The user selected shared memory object autonomic promotion feature enables a selected segment size of a shared memory object to be provided responsive to a user request for a shared memory object. For example, the operating system can allow a user to specify the segment size, by having a flag that an application code can use and pass into a shared object creation code. When the operating system identifies such a flag, the operating system can use the selected larger segment size when the shared memory object meets certain predefined criteria.

The user selected shared memory object autonomic promotion feature enables providing a selected segment size of a shared memory object with an autonomic segment size promotion control. For example, as part of the shared memory creation code the operating system checks whether one or more predefined control mechanisms are active and the operating system also can check if the shared memory object requested meets other predefined secondary criteria. The autonomic promotion feature providing autonomic segment size promotion control, for example that can be enabled by a knob, an environment variable, or some other control mechanism. The operating system can target a specific process, an execution environment, or all processes on the system for the user based on the user selected shared memory object autonomic promotion feature. The operating system can automatically promote a larger segment size without requiring the user to modify their application code. The user selected shared memory object autonomic promotion feature provides significant value by allowing users to take advantage of a resulting performance improvement that comes with larger segment sizes without having to change or update their existing applications.

By maintaining separate secondary criteria for the segment size promotion, the operating system can retain the ability to only promote the larger segment size for shared memory objects that benefit from the larger segment size. For example, the segment size promotion can be gated, based on the page size used by the shared memory object, the size of the object, the process type, and other separate secondary criteria.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as User Selected Shared Memory Object Autonomic Promotion Feature 182, Shared Memory Object Creation Component 184, and Shared Memory Autonomic Segment Promotion Component 186 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure enable enhanced shared memory object management features by implementing a selected segment size of a shared memory object in a paged-segmented operating system. A user selected shared memory object feature of disclosed embodiments, enables implementation of a selected segment size of a shared memory object. The user selected shared memory object autonomic promotion feature enables a selected segment size of a shared memory object responsive to a shared object request of a user application.

The user selected shared memory object feature of disclosed embodiments enables an autonomic segment size promotion control to implement of a selected segment size of a shared memory object. For example, as part of the shared memory object creation code the operating system checks that one or more predefined control mechanisms are active and the operating system also checks if the shared memory object requested meets other predefined criteria. The operating system can automatically promote the use of the larger segment size without requiring the user to modify their application code. This provides value as it can allow users to take advantage of a resulting performance improvement from the larger segment size without having to change or update their existing applications.

Figure 2:
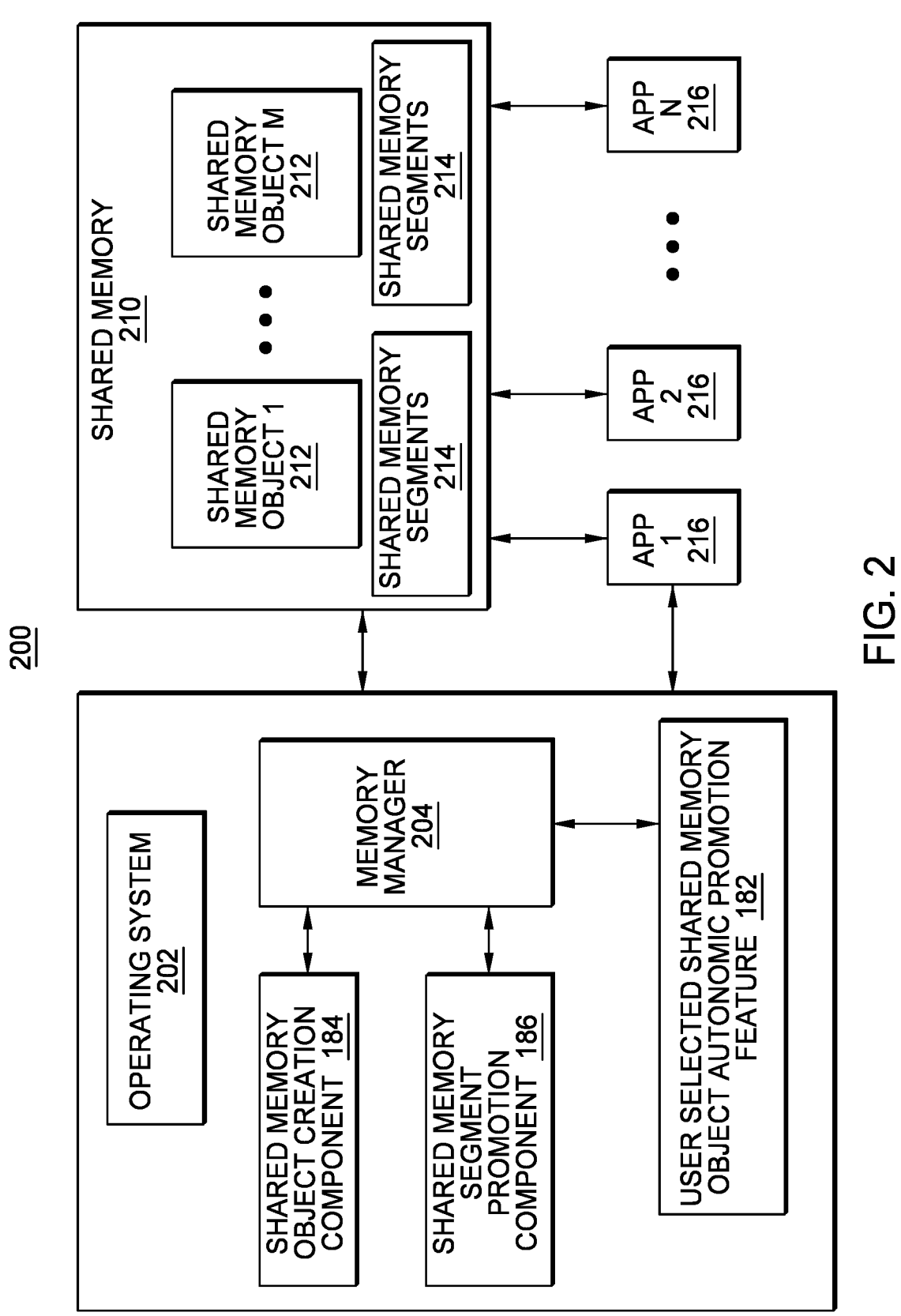
FIG. 2 is a block diagram of an example system for implementing a selected segment size of a shared memory object in a paged-segmented operating system of one or more disclosed embodiments.

FIG. 2 illustrates an example system 200 for implementing a selected segment size of a shared memory object in a paged-segmented operating system of one or more disclosed embodiments. System 200 includes an operating system 202 (e.g., the operating system 122 in FIG. 1) comprising a paged-segmented operating system. The paged-segmented operating system 202 includes a memory manager 204, such as a Virtual Memory Manager 204, a User Selected Shared Memory Object Autonomic Promotion Feature 182, a Shared Memory Object Creation Component 184, and a Shared Memory Autonomic Segment Promotion Component 186 of one or more disclosed embodiments. System 200 includes a system shared memory 210 that includes one or more shared memory objects 1-M, 212, each including one or more shared memory segments 214. System 200 includes one or more user applications 1-N, 216 using the system shared memory 210. The paged-segmented operating system 202 manages the allocation and deallocation of shared memory objects 1-M, 212 and shared memory segments 214 to various processes or user applications 1-N, 216.

For example, with a shared memory segment size of a 256 MB and a shared memory object size of 512 Gigabytes (GB), 2,048 segments are used to contain the 512 GB shared memory object. With a selected shared memory segment size of 1 Terabytes (TB), only a single 1 TB segment is used to contain the 512 GB shared memory object. Use of the single large segment due to autonomic promotion can provide significant performance improvement without the user having to change or update their existing applications.

The paged-segmented operating system 202 can be implemented for example, by an IBM Advanced Interactive eXecutive (AIX) operating system, or a UNIX operating system. The paged-segmented operating system 202 can include a plurality of predefined system calls that can be implemented together with a user selected shared memory object feature enabling a selected segment size of a shared memory object. A UNIX system call fork( ) provides an operation whereby a process creates a copy of itself. For example, an identifier of the segment is called the shmid and the UNIX system call shmget( ) is used to create a new segment or obtain the ID of an existing segment. When the shmid call succeeds, the shmget( ) system call returns the shared memory segment ID (shmid) that is used in other APIs, such as shmat( ). The shmat( ) system call attaches an existing shared memory object into the calling process's address space. A system call shmctl( ) is used to alter the permissions and other characteristics of a shared memory segment. UNIX system calls such as shmctl( ), commands (ipcs, ipcrm) are used to perform status/control operations.

Embodiments of the present disclosure enable the available AIX or UNIX system calls to be used without modification with the User Selected Shared Memory Object Autonomic Promotion Feature 182 of disclosed embodiments. The operating system uses the User Selected Shared Memory Object Autonomic Promotion Feature 182 to allow a user to specify the segment size for the shared object, such as for an application, a specific process, multiple processes and process types, and an execution environment of the user.

Figure 3:
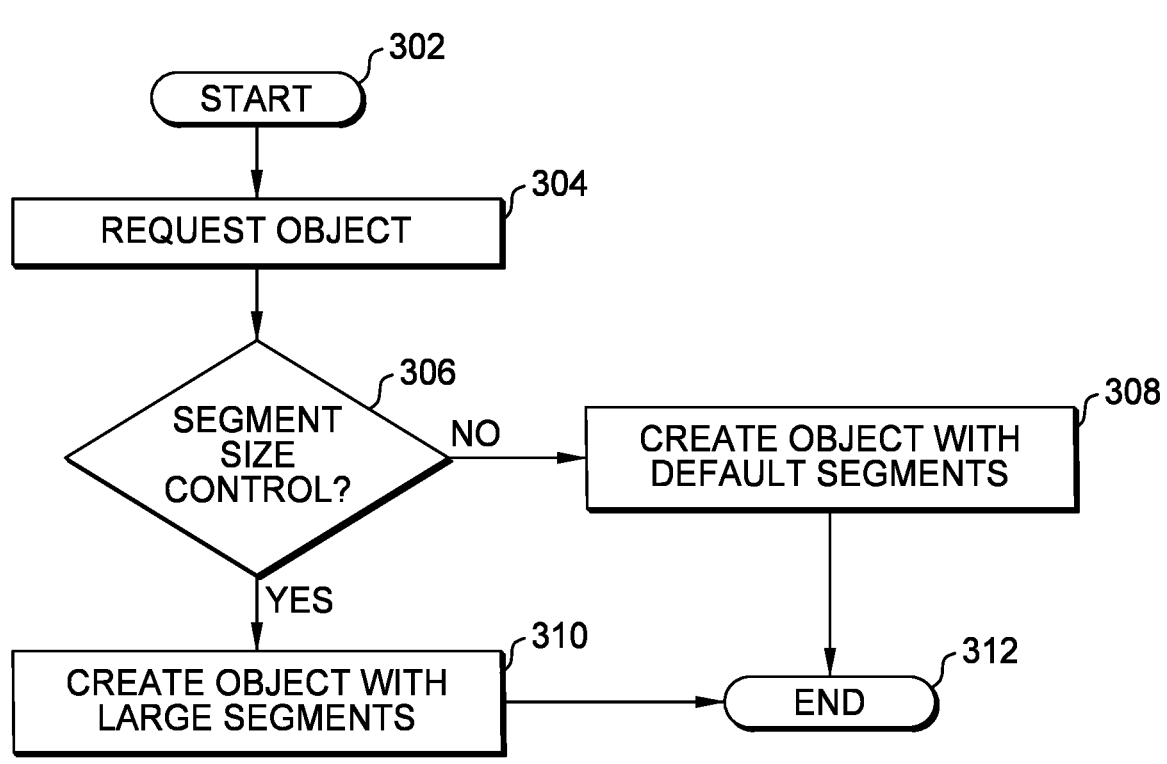
FIG. 3 is a flow chart illustrating example operations for implementing a selected segment size of a shared memory object of a paged-segmented operating system responsive to a request object including a user specified segment size of a user selected shared memory object feature of one or more disclosed embodiments.

Referring to FIG. 3, there are shown example operations of a method 300 for implementing a selected segment size of a shared memory object of a paged-segmented operating system responsive to a user request for a shared object of one or more disclosed embodiments. Method 300 may be implemented with the paged-segmented operating system 202, and for example, computer 101 together with the User Selected Shared Memory Object Autonomic Promotion Feature 182 and the Shared Memory Object Creation Component 184 of FIG. 1 to provide an example control of the paged-segmented operating system 202 of the disclosed embodiments.

In FIG. 3 at block 302, operations start for creation of a shared memory object for a specific process, such as application 1, 206. At block 304, the paged-segmented operating system 202 receives a request for a shared memory object from the specific process, application 1, 206. At decision block 304, the paged-segmented operating system 202 checks the User Selected Shared Memory Object Autonomic Promotion Feature 182 that can enable user segment size control. The User Selected Shared Memory Object Autonomic Promotion Feature 182 enables selections by a user and can receive user input to enable creating a shared memory object with a user input selected segment size, such as a large segment size rather than the default segment size. For example, User Selected Shared Memory Object Autonomic Promotion Feature 182 can identify a user selected larger segment size such as by providing a flag that a user application code can use and pass into a shared object creation code. When the operating system 202 does not identify the user selected shared object feature, the operating system 202 creates the shared memory object with the standard, default segment size at block 308.

In accordance with features of a disclosed embodiment, at block 306 when the operating system 202 checks the User Selected Shared Memory Object Autonomic Promotion Feature 182 and can identify a notification such as a flag that the user application code passes into a shared memory creation code, the operating system 202 can allow a user to specify the segment size. As indicated at block 310, the operating system 202 creates the shared memory object with the user selected larger segment size. For example, the operating system 202 can use a larger segment size to create the shared memory object at block 310 if the shared memory object meets certain criteria. For example, the operating system 202 can check additional predetermined criteria for the shared memory object, such as a page size (i.e., 4K page vs 16K page) used by the shared memory object 210, the size of the shared memory object 210, the process type (i.e., 32 bit vs 64 bit) among other criteria. Based upon evaluating such separate criteria for the shared memory object, the operating system 202 can use a larger segment size, or the standard default segment size, to create the shared memory object. For example, the standard default segment size can be selected based on evaluating criteria for the shared memory object with a 4K page size, or the shared memory object 210 has a size less than a predefined threshold shared memory object size. The shared memory object creation process ends at block 312.

Figure 4:
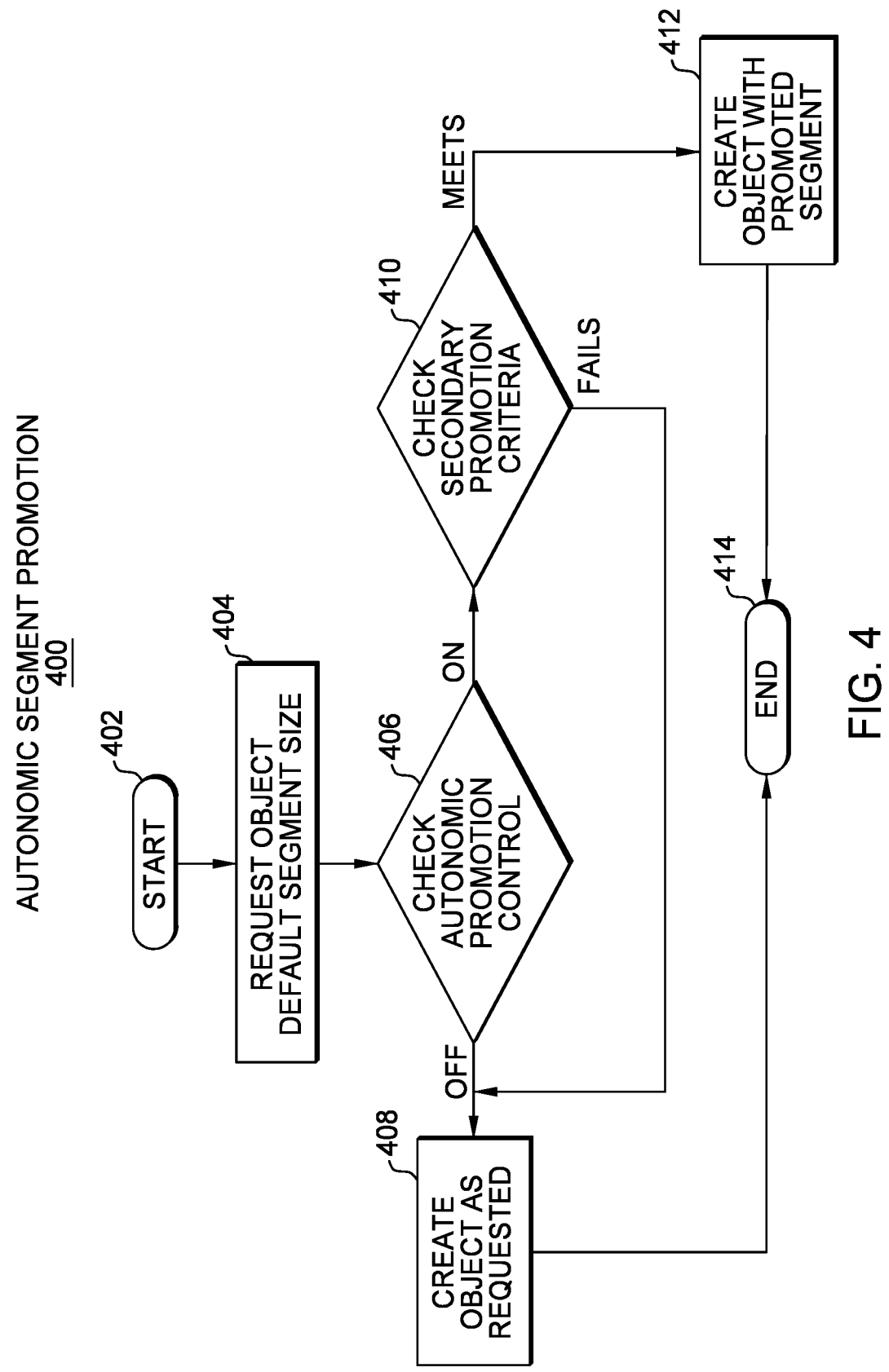
FIG. 4 is a flow chart illustrating example operations for implementing a selected segment size of a shared memory object of a paged-segmented operating system responsive to an autonomic promotion control of a user selected shared memory object feature one or more embodiments.

Referring to FIG. 4, there are shown example operations of a method 400 for implementing a selected segment size of a shared memory object of a paged-segmented operating system responsive to an autonomic segment promotion control of one or more disclosed embodiments. Method 400 may be implemented with the paged-segmented operating system 202, and for example, computer 101 together with the User Selected Shared Memory Object Autonomic Promotion Feature 182 and the Shared Memory Autonomic Segment Promotion Component 186 of FIG. 1 to provide an example autonomic segment promotion control of the paged-segmented operating system 202 of the disclosed embodiments. Method 400 implements a selected segment size of a shared memory object with the paged-segmented operating system 202, providing an autonomic segment promotion control to use a larger segment size without the user having to modify their application code.

In FIG. 4 at block 402, example operations of method 400 start for autonomic segment promotion control to create a shared memory object, such as for application 2, 206. At block 404, paged-segmented operating system 202 receives a request for a shared memory object that includes the standard default segment size for the specific existing application 2, 206. At decision block 304, paged-segmented operating system 202 checks the User Selected Shared Memory Object Autonomic Promotion Feature 182 that can enable the autonomic segment promotion control. For example, the User Selected Shared Memory Object Autonomic Promotion Feature 182 can receive a user input enabling the autonomic segment promotion for all applications associated with the specific user. When the user selected shared memory object feature enabling the autonomic segment promotion control is not found, the operating system 202 creates the shared memory object with the standard, default segment size at block 408.

When the User Selected Shared Memory Object Autonomic Promotion Feature 182 enabling the autonomic segment promotion control is found, at decision block 410 the operating system 202 checks predetermined secondary promotion criteria for the shared memory object. For example, the secondary promotion criteria for the shared memory object can include, such as a page size (i.e., 4K page vs 16 M page) used by the shared memory object, the size of the object, the process type (i.e., 32 bit vs 64 bit) of the application 216, and other like criteria. Based upon evaluating such secondary promotion criteria for the shared memory object, at block 412 the operating system 202 can use the promoted larger segment size to create the shared memory object when the shared memory object meets the other secondary promotion criteria. Otherwise, when the shared memory object fails to meet the other secondary promotion criteria the standard default segment size is used to create the shared memory object at block 408. The example autonomic segment promotion process creating the shared memory object ends at block 414.

Referring to FIG. 5, there are shown example operations of a method 500 for implementing a selected segment size of a shared memory object of a paged-segmented operating system of one or more disclosed embodiments. Method 500 may be implemented with the paged-segmented operating system 202, and for example, computer 101 together with the User Selected Shared Memory Object Autonomic Promotion Feature 182, the Shared Memory Object Creation Component 184 and the Shared Memory Autonomic Segment Promotion Component 186 of FIG. 1.

In FIG. 5, operations of method 500 begin as indicated at block 502, with the operating system 202 accessing the User Selected Shared Memory Object Autonomic Promotion Feature 182 of disclosed embodiment. The User Selected Shared Memory Object Autonomic Promotion Feature 182 enables selections by a user and can receive user input to enable creating a shared memory object with a user input selected segment size, (e.g. as shown in example method 300 of FIG. 3) and with an autonomic promotion of the selected segment size (e.g. as shown in example method 400 of FIG. 4).

For example, the user input can include a knob (such as a tunable parameter) to enable a selected segment size of a shared memory object for the user's applications. That is, the tunable commands can be used to configure current or next boot values for Virtual Memory Manager tuning parameters, including a selected segment size of a shared memory object. The user input can include a flag, an environment variable, or another control mechanism so that the operating system 202 can target a specific process, execution environment, or all processes and enable a selected segment size of a shared memory object.

At block 504, the paged-segmented operating system receives a request shared memory object of a user application. At block 506, the paged-segmented operating system processes the request shared memory object and checks an associated user selected shared memory object feature for the user application for the request shared memory object. When an associated user selected shared memory object feature for the user application is not found, a shared memory object is created with a standard default segment size at block 508. Otherwise, at block 510, an identified user selected shared memory object feature for the user application is used to selectively evaluate a selected segment size and evaluate secondary criteria for the request shared memory object at block 510. At block 512, the operating system sets a segment size for the request shared memory object based on the user selected shared memory object feature and secondary criteria evaluation results, and creates a shared memory object with the selected segment size.

In brief, assuming a shared memory object of 512 Gigabytes in size, with a 256 M segment size, 2,048 segments are required to contain the 512 GB shared memory object. While with a selected large segment size of disclosed embodiments, such as a 1 TB segment size, the entire object can be contained in the single segment. As a result, instead of managing 2,048 segments, the operating system only needs to manage the one 1 TB segment, providing significant performance improvement.

While the foregoing is directed to embodiments of the present invention, other and further embodiments of the invention may be devised without departing from the basic scope thereof, and the scope thereof is determined by the claims that follow.

What is claimed is:

1. A method comprising:

providing a user selected shared memory object autonomic promotion feature to receive a user input enabling a selected segment size;

receiving a request for a shared memory object of a user application;

accessing the user selected shared memory object autonomic promotion feature to identify a user selection;

setting a segment size for the request for the shared memory object based on the user selected shared memory object autonomic promotion feature, and creating the shared memory object having one or more segments with the set segment size.

2. The method of claim 1, further comprising:

receiving a second request for a second shared memory object of a second user application; and creating the shared memory object having one or more segments with a default segment size when a user selection is not found from accessing the user selected shared memory object autonomic promotion feature.

3. The method of claim 1, wherein providing a user selected shared memory object autonomic promotion feature further comprises enabling the user selected segment size of a shared memory object for a specific user process type for the user.

4. The method of claim 1, wherein providing a user selected shared memory object autonomic promotion feature further comprises enabling the user selected segment size of a shared memory object for an execution environment of the user.

5. The method of claim 1, wherein providing a user selected shared memory object autonomic promotion feature further comprises enabling the user selected segment size of a shared memory object for multiple user process types for the user.

6. The method of claim 1, wherein accessing the user selected shared memory object autonomic promotion feature comprises checking for one or more predefined control mechanisms being active.

7. The method of claim 6, wherein checking for one or more predefined control mechanisms being active comprises checking for an active tunable knob.

8. The method of claim 6, wherein checking for one or more predefined control mechanisms being active comprises checking for an active environment variable.

9. The method of claim 1, wherein setting a segment size for the request for the shared memory object based on the user selected shared memory object autonomic promotion feature further comprises checking secondary promotion criteria for the shared memory object, wherein the secondary promotion criteria comprises one or more of a page size used by the shared memory object, a size of the shared memory object and a process type of the user application.

10. The method of claim 1, wherein setting a segment size for the request for the shared memory object based on the user selected shared memory object autonomic promotion feature further comprises setting a promoted segment size to create the shared memory object when the shared memory object meets predefined secondary promotion criteria.

11. A system, comprising:

a processor; and a memory, wherein the memory includes a computer program product configured to perform operations for implementing a selected segment size of a shared memory object in a page segmented operating system, the operations comprising:

providing a user selected shared memory object autonomic promotion feature to receive a user input enabling a selected segment size;

receiving a request for a shared memory object of a user application;

accessing the user selected shared memory object autonomic promotion feature to identify a user selection;

setting a segment size for the request for the shared memory object based on the user selected shared memory object autonomic promotion feature, and creating the shared memory object having one or more segments with the set segment size.

12. The system of claim 11, further comprising:

receiving a second request for a second shared memory object of a second user application; and creating the shared memory object having one or more segments with a default segment size when a user selection is not found from accessing the user selected shared memory object autonomic promotion feature.

13. The system of claim 11, wherein providing a user selected shared memory object feature comprises enabling the user selected segment size of a shared memory object for multiple user processes for the user.

14. The system of claim 11, wherein accessing the user selected shared memory object feature comprises checking for one or more predefined control mechanisms being active, wherein the predefined control mechanisms comprise one or more of an environment variable, a predefined parameter, and a tunable knob.

15. The system of claim 11, wherein setting a segment size for the request for the shared memory object based on the user selected shared memory object feature further comprises checking secondary promotion criteria for the shared memory object, wherein the secondary promotion criteria comprises one or more of a page size used by the shared memory object, a size of the shared memory object and a process type of the user application.

16. A computer program product for implementing a selected segment size of a shared memory object in a paged-segmented operating system, the computer program product comprising:

a computer-readable storage medium having computer-readable program code embodied therewith, the computer-readable program code executable by one or more computer processors to perform an operation comprising:

providing a user selected shared memory object autonomic promotion feature to receive a user input enabling a selected segment size;

receiving a request for a shared memory object of a user application;

accessing the user selected shared memory object autonomic promotion feature to identify a user selection;

setting a segment size for the request for the shared memory object based on the user selected shared memory object autonomic promotion feature, and creating the shared memory object having one or more segments with the set segment size.

17. The computer program product of claim 11, wherein the computer-readable program code is further executable to:

receiving a second request for a second shared memory object of a second user application; and creating the shared memory object having one or more segments with a default segment size when a user selection is not found from accessing the user selected shared memory object autonomic promotion feature.

18. The computer program product of claim 16, wherein providing a user selected shared memory object feature comprises enabling the user selected segment size of a shared memory object for multiple user processes for the user.

19. The computer program product of claim 16, wherein accessing the user selected shared memory object autonomic promotion feature comprises checking for one or more predefined control mechanisms being active, wherein the predefined control mechanisms comprise one or more of an environment variable, a predefined parameter, and a tunable knob.

20. The computer program product of claim 16, wherein providing a user selected shared memory object autonomic promotion feature comprises enabling a user input of an autonomic segment size promotion control for the user application, without modifying the user application.

* * * * *